United States Patent Office 3,525,866
Patented Aug. 25, 1970

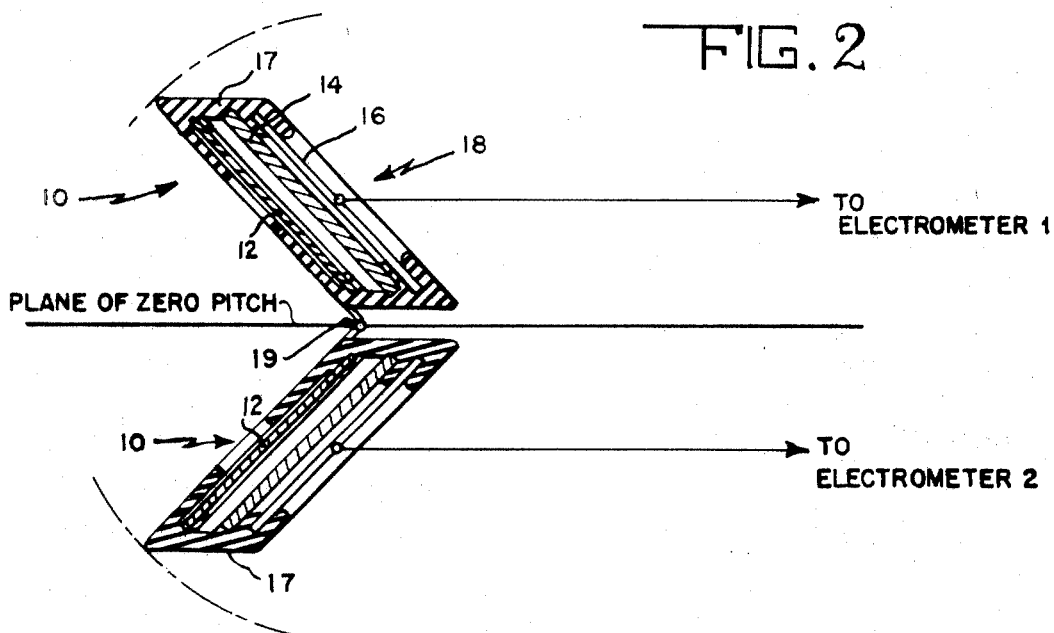
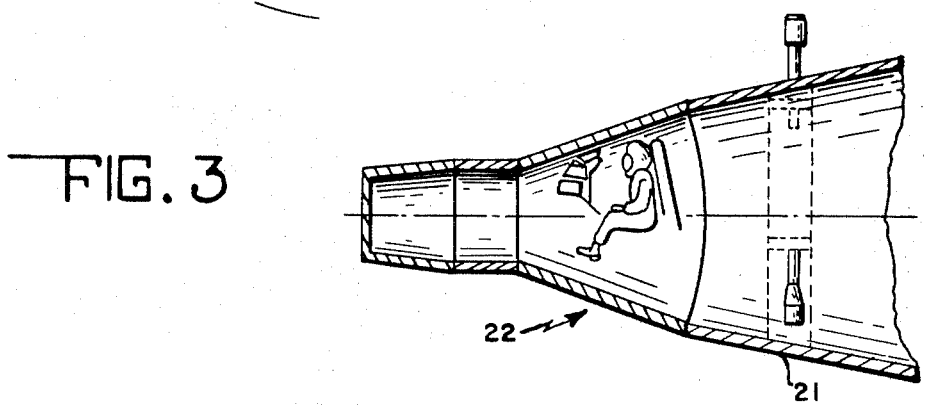
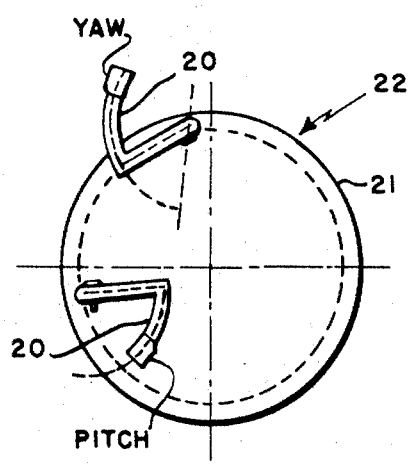

3,525,866
ATTITUDE SENSING UTILIZING ENVIRON-
MENTAL POSITIVE IONS
Rita C. Sagalyn, 41 Peacock Farm Road, and Michael Smiddy, 144 Concord Ave., both of Lexington, Mass. 02173
Filed Feb. 26, 1968, Ser. No. 708,056
Int. Cl. G01t 1/16
U.S. Cl. 250—83.3                12 Claims

ABSTRACT OF THE DISCLOSURE

An attitude sensing system utilizing the properties of ambient positive ions by combining the outputs of two flat, planar electrostatic analyzers or probes with a sensor configuration mounted symmetrically at a predetermined angle about the appropriate axis directly to provide angles of pitch and yaw.

BACKGROUND OF THE INVENTION

This invention relates generally to attitude sensing systems and more particularly to one which utilizes a pair of flat, planar electrostatic ion probes or analyzers with a sensor configuration which are mounted symmetrically about the appropriate axis such that a combination of the outputs directly provides pitch and yaw angles.

It has been proposed previously to utilize ion probes in navigation systems for satellites; however, the configuration of the probes and the fact that they were adjusted to operate with a difference current (which is proportional to the charge particle density, the particle charge, the velocity of the vehicle and some function of angular position) did not allow for proper measurement results. Because of the large variations in charge density (up to the order of 3 magnitudes), it is impossible to deduce that portion of the difference current which is due to changing angular positions, ion density or vehicle velocity. This type of probe even in theory would not operate efficiently and thus was never used in the spacecraft program of the United States.

That which was originally relied on and used for attitude control of spacecraft involved an inertial guidance system; however, this type of system caused difficulties in control of the spacecraft due to a large lag in response time, e.g., eight seconds with variations in yaw angle. The time lag in response to pitch variations was found to cause a wastage of fuel in taking corrective action. There are limitations also in the degree of change that can be accommodated by an inertial system. Furthermore, it took approximately 40 minutes to stabilize and warm up an inertial system after power turn-on due to the electronic circuitry and adjustment of gyroscopes.

SUMMARY OF THE INVENTION

The invention comprises an attitude sensing system which utilizes multi-electrode, electrostatic analyzers or ion probes which are flat and planar. The shape allows for simplicity in data interpretation and utilization due to the fact that the ions presented reach the analyzer at the proper time and with the simplest angular relationship to current. The outputs from each sensor are amplified by electrometers or amplifiers and are then electronically added, subtracted, and the resultant sum and difference currents are integrated and compared. The final output (tangent $\theta$) may then be utilized for a transmission to earth, to a flight director's indicator and/or control system for the spacecraft. Direct readings of pitch and yaw or other attitude measurements may be effected by placing the analyzers or probes at a predetermined angle to the appropriate axis. Additionally, the system may be combined with an horizon scanner or other earth or planet oriented system such as the currently used system for determining the orbital plane with respect to earth by tracking stations and determining the local vertical. Automatic control would require the addition of a servo system or other means for affecting control.

Accordingly, it is a primary object of this invention to provide an attitude sensing system which is capable of accurate yaw, pitch and roll rate measurements.

It is another object of this invention to provide an attitude sensing system which together with an horizon scanner is capable of measuring pitch, roll and yaw for either manned or unmanned spacecraft or sonic transport vehicles under manual or automatic control.

It is still another object of this invention to provide an attitude sensing system which provides an improvement factor of 1,000 in response time, 50 in weight, 50 in power, infinity in life time, 15 in volume and 50 in cost over inertial systems currently used in the United States spacecraft program.

It is a further object of this invention to provide an attitude sensing system utilizing ion probes which require only D.C. signals, thereby providing simplicity and a high degree of accuracy. A.C. signals particularly of high frequencies for modulation and switching may also be used.

It is a still further object of this invention to provide an attitude sensing system which utilizes pairs of flat, planar electrostatic analyzers or probes with sensor configurations which are mounted symmetrically at a predetermined angle about the appropriate axis such that the outputs therefrom may be combined directly to give pitch and yaw angles.

Another object of this invention involves the provision of an attitude sensing system which has an extremely short response time and stabilization and warm up time.

Still another object of this invention involves attitude measurement which does not require a particular vehicle motion and which operates to measure pitch and yaw without adverse effects from vehicle roll position or direction of flight (either forward or reverse).

A further object of this invention involves the measurement of roll rate with a single ion probe.

A still further object of this invention involves the provision of an attitude sensing system which utilizes the properties of ambient positive ions and provides a high degree of accuracy coupled with attendant savings in fuel for the vehicle on which it is mounted.

Another object of this invention involves the provision of an attitude sensing system capable of operation throughout 360° variations in attitude.

An additional object of this invention involves the provision of an attitude sensing system capable of providing automatic control of exotic vehicles wherein the system is not affected by vehicle velocity or density changes of ions in a space environment.

It is a still further object of the invention to provide a device which is economical to produce and utilizes conventional, currently available components that lend themselves to standard mass production manufacturing techniques.

These and other advantages, features and objects of the invention will become more apparent from the following description taken in connection with the illustrative embodiments in the accompanying drawings.

DESCRIPTION OF THE DRAWINGS

FIG. 2 illustrates schematically the sensor arrangement of analyzers about the pitch axis of a vehicle;

FIG. 3 is a schematic front view of a spacecraft illustrating the mounting of the sensors on booms of a spacecraft;

FIG. 4 is an end view of FIG. 3; and

DESCRIPTION OF THE EMBODIMENT

In the altitude range of 60 miles to 10 earth radii, positive ions and electrons which are produced primarily by photoionization exist in equal concentrations. The number density varies greatly in space with time; for example, the charge density reaches a maximum of the order of $10^6$ per cubic centimeter in the vicinity of the F region maximum at approximately 350 km. and decreases to approximately 100 per cubic centimeter at about 10 earth radii. There are also great variations in the number densities on the day and night side of the earth, in the vicinity of the geomagnetic equator, and in the lower ionosphere below approximately 1000 km. Very rapid increases in ion and electron concentrations occur at sunrise due to photoionization and dissociation of the neutral atmosphere constituents. More gradual decreases in density occur at local sunset when recombination and diffusion become important.

The average energy of the charged particles varies from about 0.01 electron volt at 100 km. to approximately 0.4 electron volt at 10 earth radii. The kinetic temperature of the charged particles in the altitude range covered by spacecraft of the U.S. space program varied from approximately 250° Kelvin to about 3000° Kelvin. It has been demonstrated that the charged particles in the upper atmosphere have an essentially Maxwellian velocity distribution. The average thermal velocity of the particles may then be given by the relation:

$$v = \left(\frac{8kT}{\pi m}\right)^{1/2} \quad (1)$$

where:

$k$=Boltzman's constant,
$T$=temperature in degree Kelvin,
$m$=mass in grams, and
$v$=thermal velocity in centimeters per second.

Substituting in Equation 1 representative values for temperature and mass of the positive ions, one finds that their random thermal velocity varies between 0.8 and 1 km. per second over the altitude range of the spacecraft orbit of, for example, the Gemini spacecraft of the U.S. space program. Satellites orbiting in the upper ionosphere have varying average velocities depending upon the nature of the orbit; however, typical satellite speeds vary between 7 km. per second and 11 km. per second. The spacecraft velocity is, therefore, approximately 10 times greater than the average thermal velocity of the positive ions. Relative to the spacecraft, the positive ions possess negligible velocity. It should be noted that the situation is very different for electrons since their average mass is approximately $10^4$ times less than that of the ions. Applying Equation 1, the average electron velocity is calculated to be about 30 times greater than the vehicle velocity. The fact that positive ions may be considered stationary with respect to the spacecraft velocity is fundamental to the operation of the ion attitude sensing system of this invention.

Figure 1:
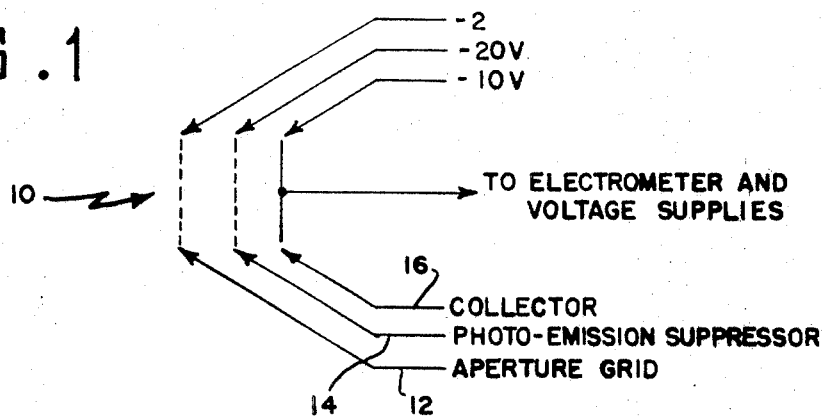
FIG. 1 is a schematic representation of the electrode arrangement and voltages applied to the flat, planar electrostatic analyzer.

If one uses a planar electrostatic analyzer or ion probe 10 of the type illustrated schematically in FIG. 1 then it can be shown that the current to the collector 16 is simply related not only to the positive ion density in the medium but also to the angle between the normal to the plane of the sensor and to the vehicle velocity.

When the ratio of the satellite velocity to the random velocity of the ions is greater than or equal to 2, and with grid and collector voltages as indicated in FIG. 1, the current $i$ to the collector is given by:

$$i = ANe \, |v| \, f(v) \alpha \quad (2)$$

where:

$A$=aperture area,
$N$=the positive ion density,
$|v|$=magnitude of the ion velocity, a function of the satellite velocity and position of the sensor with respect to the direction of motion,
$f(v)$=a function of the vehicle potential with respect to the undisturbed plasma,
$\alpha$=an experimentally determined transmission factor, and
$e$=the particle charge.

As shown schematically in FIG. 1 the multi-electrode electrostatic analyzer or ion probe 10 comprises three electrodes which act to sense positive ions. The device is comprised of an aperture grid 12, which is maintained at a D.C. potential of −2 volts, to eliminate fields from said probe extending into the space environment, a photo-emission suppressor grid 14 to screen a collector from electrons and suppress collector photoelectrons and a charged-particle collector 16.

As will be explained later, the collector 16 is connected to an electrometer and it and the grids are connected to voltage supplies. The photo-emission suppressor grid 14 is maintained at −20 volts D.C. while the collector 16 is at −10 volts D.C.

The voltages given are relative one to another and are based on the potential of the satellite relative to its environment. The voltages chosen are those which enable the maximum number of ions which enter the aperture of the aperture grid to impinge on the flat collector plate in relation to time without distortion. In order to allow for all positive ions entering the aperture to impinge on the collector, it should be elongated ovally since it is at an angle to the axis of the vehicle. The utilization of a flat, planar configuration of the collector 16 of probe 10 rather than a cylindrical or spherically shaped analyzer, allows for simplicity in data interpretation and utilization for angular measurement since the ions reach the plate in the proper time relationship and with the simplest functional dependence on angular position. Since only D.C. potentials are required on the elements of the electrostatic analyzer, a high degree of accuracy is capable of being obtained with an attendant simplicity; however, A.C. biasing with high frequencies may be used and would also have an advantage of providing modulation and switching.

Since under the experimental conditions which are found in outer space the ions may be considered fixed and the magnitude of the velocity $|V|$ is equal to $v_s \cos \theta$, where $v_s$ is a spacecraft velocity and $\theta$ is the angle between the direction of motion of the vehicle and a normal to the plane of the sensor, Equation 2 then becomes:

$$i = ANev_s \cos \theta f(v) \alpha \quad (3)$$

It is seen from Equation 3 that the planar ion probe current is highly dependent on its orientation with respect to the direction of motion. This characteristic of the planar probe or analyzer 10 is utilized in the pitch attitude control system with the sensor configuration shown schematically in FIG. 2. For example, for pitch measurement, two identical analyzers or ion probes 10 are aligned at from about 10°–85°, dependent on accuracy and flight objectives, with respect to the plane of zero pitch and thereby becomes a sensor unit 18. An identical sensor unit 18, mounted symmetrically about the zero yaw plane, is used for the measurement of yaw angles. These two independent units are mounted on booms 20 approximately three feet in length which are located in the aft section 21 of the spacecraft 22. If booms are used, they are pyrotechnically or otherwise extended on command by the astronaut at the appropriate time after orbital injection is accomplished by any conventional means to cause their rotation from the stored position. The yaw sensor is shown extended in FIG. 4 while the pitch sensor is in its stored position. The location of the sensor units 18 and the boom lengths are set to minimize the influence of spacecraft structure, wake, contamination, and space-charge effects while providing the desired look angle.

The location, for exemplary purposes only, of the booms 20 and sensor units, as shown in FIGS. 3 and 4, should not be limited to placement of these elements in the aft section 21 of the vehicle. In fact, when the aft section is to be removed before retrofire, the sensors must be placed on the main spacecraft in order that it may be made available for re-entry maneuvers. Additionally, a forward position on the main spacecraft would reduce the effects of vehicle shadowing. The distance from the vehicle is not critical; however, the spacing should be great enough to minimize spacecraft interference with the sensor units and allow for maximization of the look angle. During a flight of a spacecraft of the U.S. space program, a lesser distance was employed and thrusters were fired in the direction of the sensors thereby causing a temporary increase in charge density; however, no deterioration of the sensors or their measurement operation resulted. The spacing of the sensors from the vehicle allows for operation of the measurement function in both the forward and reverse direction of the vehicle; however, the sensors could be mounted on the nose of an aerodynamically clean configuration without the need for booms at all. For forward and reverse measurements a sensor unit or probe would be placed on the side of the vehicle as well as on the nose. Additionally, a cover, not shown, may be provided to protect the sensing unit until it is required to provide its measurement function, at which time the cover would be opened to expose the sensor to the environment. Alternatively, a releasable shroud may be utilized.

The principle of operation of the system may be understood by considering first the measurement of pitch. Except for the change in the axis of alignment, as indicated above, the analysis of the yaw measurement is identical. Fundamental to the operation of the system is the use of only two ion probes aligned symmetrically about the pitch axis as shown in FIG. 2, the current to the collector of each probe is given by:

$$i_1 = N e v_s \alpha A \cos(45 - \theta) \quad (4)$$

$$i_2 = N e v_s \alpha A \cos(45 + \theta) \quad (5)$$

where:

$i_1$ = current to sensor 1,
$i_2$ = current to sensor 2, and
$\theta$ = pitch angle (in degrees).

Solving Equations 4 and 5 for $\theta$ one obtains:

$$\tan \theta = \frac{i_1 - i_2}{i_1 + i_2} \quad (6)$$

For $\theta$ les than or equal to 20°, tangent $\theta$ is equal to $\theta$, in radians.

From Equation 6 it is seen that the output of the system may be displayed on a meter (not shown) calibrated directly in radians or converted to degrees, and that changes in charge density N or satellite velocity $v_s$ do not affect the angular measurement.

When larger angular variations of the vehicle about an axis are contemplated, Equation 6 is still utilized; however, for a high degree of accuracy capable of use in the satellite program, an adjustment has to be made due to the variation in tan $\theta$ from $\theta$ in radians. One method would be to vary the angle of the analyzers 10 relative to the vehicle axis. For example, referring to FIG. 2, when the elements of the analyzers 10 are combined as a unit in a housing 17 such that the elements are insulated one from another, the angle may be varied, for example, from between about 10° and 85°, by rotating the individual analyzers 10 about a hinge axis 19, as shown by the phantom lines. Any conventional linkage or servo arrangement could be provided to accomplish this purpose. Alternatively, the circuitry for computing the ratio may be adjusted to compensate for the larger angle; thus, angles up to 360° are within the realm of this invention.

Figure 5:
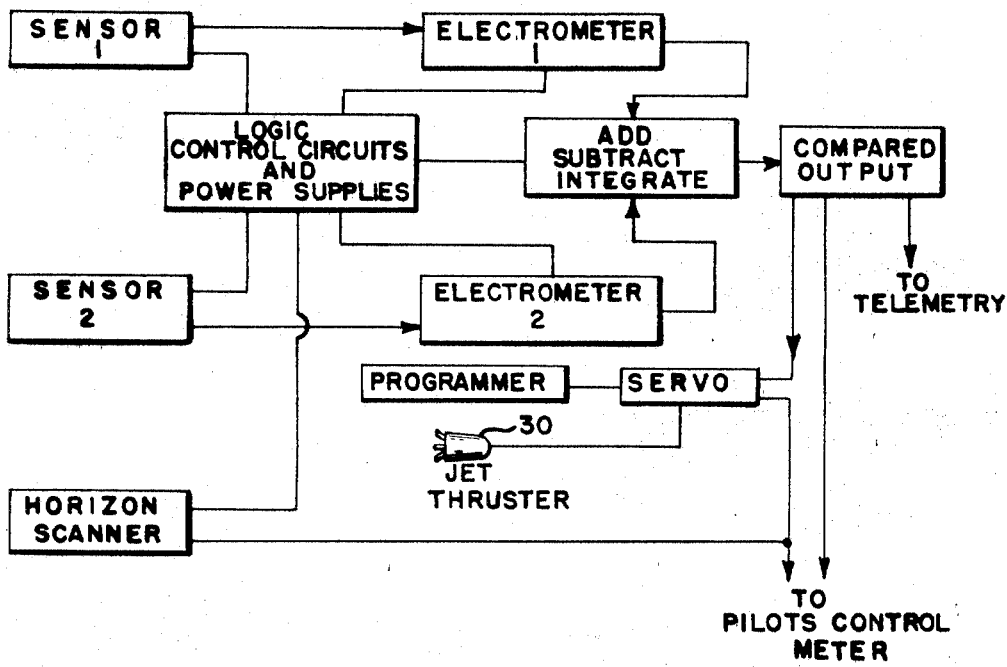
FIG. 5 is a block diagram of the ion attitude sensing system of this invention, also included are elements for rendering the system capable of automatic operation.

A block diagram of the attitude system is shown in FIG. 5. Each sensor is biased with the appropriate voltage from the logic control circuit and power supplies unit. This unit also provides the necessary power for the remainder of the measurement and control circuitry. Additionally, the logic control portion of the unit could be used for internal calibration, extending booms 20 and monitoring the mode.

The output of each sensor is amplified by electrometers 1 and 2. In order to obtain the desired accuracy over the current range $10^{-6}$ to $10^{-11}$ amperes, stable linear amplifiers or electrometers with range switching covering five current decades are employed. The outputs of electrometers 1 and 2 are then electronically added, subtracted, integrated, and compared, as indicated in the block diagram. The final output, tangent $\theta$, referred to as the compared output, is utilized for vehicle control and may be sent to the flight director's indicator, to an on-board magnetic tape which is periodically transmitted to ground stations, and also may be transmitted in real time to ground stations or to an automatic control.

It should be understood that although a particular block diagram showing conventional circuits may be utilized, any means for receiving the sensor unit output and obtaining the ratio representing tan $\theta$ could be used. Additionally, although, broadly stated, the ratios of the difference and sum of currents of a sensor unit have been described relative to the tangent of the angle of the axis of symmetry of the sensor unit and the vehicular velocity vector, they may also be used with other trigonometric relationships which could be accommodated by circuitry. This would allow for a choice of a trigonometric function which would give improved accuracy at particular angular orientations.

Since roll or spin rate is proportional to change in current from a single collector of a sensing unit, the collector outputs may also be monitored for roll rate information. The system may be combined with an horizon scanner for complete attitude measurement. When automatic control is desired, a servo system may be added to control jet thrusters 30 or other control means properly oriented upon receipt of an error signal, for example, from a programmer, when the attitude of the vehicle is not on a desired flight pattern.

In addition to attitude information the system is also utilizable for obtaining information on the ambient ion densities and on the variation of positive ions in the wake of the vehicle.

Thus, there has been provided a sensing unit arrangement which utilizes environmental positive ions to measure spacecraft angular position to provide earth-centered attitude determination as well as spacecraft attitude with respect to vehicle direction of motion. The performance of the pitch and yaw functions are achieved with only one sensing unit consisting of only one pair of electrostatic analyzers for each axis, each oriented with respect to its axis at a predetermned angle. Roll may be obtained from a single probe. Variations of roll, pitch or yaw do not deleteriously affect the results nor does ion drift motion in relation to latitude have to be taken into account. The device could utilize common electronics for pitch and yaw and for both forward and reverse directions of measurement. Dependent upon the mission requirements, A.C. of a chosen frequency for biasing and switching, could be substituted for the D.C. power source, and would enable the use of a single amplifier without the need for balancing.

Although the invention has been described with reference to a particular embodiment, it will be understood to those skilled in the art that the invention is capable of a variety of alternative embodiments within the spirit and scope of the appended claims.

We claim:
1. An attitude sensing system for a vehicle operating in a partially ionized atmosphere comprising
   a pair of ion probes for collecting positive ions,
   means for mounting said pair of ion probes with respect to said vehicle, each probe being at an angle to an axis of said vehicle about which angular measurements are desired, and
   means to combine the ion currents from said probes and obtain a ratio of the combined currents which eliminates environmental variables and provides an output equal to a trigonometric function of the angle between the axis of symmetry of said pair of probes and the vehicular velocity vector.

2. An attitude sensing system as defined in claim 1 wherein the trigonometric function of said last mentioned angle is the tangent of said angle.

3. A system as defined in claim 1 wherein each of said ion probes is of the multi-electrode, electrostatic type comprising
   an aperture grid to eliminate protrusion of disturbing fields from the probe into the atmosphere,
   a substantially flat, planar collector spaced from said aperture grid for collecting positive ions entering the probe, and
   a photo-emission suppressor grid between and spaced from said aperture grid and collector for suppressing photoelectrons emitted from said collector and screening said collector from electrons entering the probe.

4. An attitude sensing system as defined in claim 3 including
   means for measuring roll rate by monitoring a collector of an ion probe.

5. An attitude sensing system as defined in claim 1 wherein said ion probes of said pair of ion probes are angularly adjustable relative to each other and said axis of said vehicle about which angular measurements are desired.

6. A navigational system for a vehicle capable of operation in a partially ionized environment comprising
   a pair of multi-electrode, electrostatic ion probes mounted about each of a number of axes of said vehicle with each probe of a pair at an angle to an axis of the vehicle, each probe of a pair comprising
      an aperture grid, to eliminate disturbing fields from the probe from protruding into said environment,
      a substantially flat, planar collector spaced from said aperture grid for collecting positive ions, and
      a photo-emission suppressor grid between and spaced from said aperture grid and collector for suppressing photo-electrons from said collector, and screening said collector from electrons entering the probe, and
   means to add and subtract the ion currents of the collectors of each pair of ion probes and provide an output which is a trigonometric function of the angular measurement about the axis about which the pair of ion probes are mounted.

7. A navigational system as defined in claim 6 wherein the trigonometric function is represented by the ratio of the difference and sum of the currents of a pair of probes to result in the tangent of the angle between the axis of symmetry of the pair of probes and the vehicular velocity vector.

8. A navigational system as defined in claim 6 wherein the said axes are the pitch and yaw axes of the vehicle.

9. A navigational system as defined in claim 6 including
   means for measuring the roll rate by monitoring the rate of change of ion current by a collector which is affected by roll.

10. A navigational system as defined in claim 6 including
    means for generating a signal in response to vehicle orientation with respect to a planet.

11. A navigational system as defined in claim 6 including
    means for generating a signal responsive to variation of the vehicle from the local vertical on a planet.

12. A navigational system as defined in claim 6 including
    control means for said vehicle, and
    means interconnecting said control means and said means to provide angular measurement about the axis about which each pair of ion probes is mounted for producing a desired control function for the vehicle.

References Cited
UNITED STATES PATENTS

| | | | |
|---|---|---|---|
| 3,188,472 | 6/1965 | Whipple | 250—83.3 |
| 3,276,725 | 10/1966 | Bennett | 244—155 |
| 3,359,407 | 12/1967 | Paige | 244—155 |

ARCHIE R. BORCHELT, Primary Examiner

U.S. Cl. X.R.

244—1; 250—83.6